(12) United States Patent
Bast

(10) Patent No.: US 9,764,743 B2
(45) Date of Patent: Sep. 19, 2017

(54) METHOD AND DEVICE FOR MEASURING AN ENGINE LOAD OF A DRIVE MOTOR OF A VEHICLE

(71) Applicant: Robert Bosch GmbH, Stuttgart (DE)

(72) Inventor: Frank Bast, Asperg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/029,516

(22) PCT Filed: Sep. 9, 2014

(86) PCT No.: PCT/EP2014/069215
§ 371 (c)(1),
(2) Date: Apr. 14, 2016

(87) PCT Pub. No.: WO2015/055352
PCT Pub. Date: Apr. 23, 2015

(65) Prior Publication Data
US 2016/0272218 A1    Sep. 22, 2016

(30) Foreign Application Priority Data
Oct. 16, 2013  (DE) .................. 10 2013 220 936

(51) Int. Cl.
*B60W 40/10*     (2012.01)
*G07C 5/08*      (2006.01)
*B60W 30/18*     (2012.01)

(52) U.S. Cl.
CPC .......... *B60W 40/10* (2013.01); *G07C 5/0808* (2013.01); *B60W 2030/1809* (2013.01);
(Continued)

(58) Field of Classification Search
CPC ............................. B60W 40/10; G07C 5/0808
(Continued)

(56) References Cited

U.S. PATENT DOCUMENTS 4,112,747 A *  9/1978  Aldridge .................. G07C 3/00
                                              73/112.01
6,360,165 B1 *  3/2002  Chowdhary .......... G01C 22/02
                                              701/495
(Continued)

FOREIGN PATENT DOCUMENTS

DE    100 40 094 A1    4/2001
DE    10040049         4/2001
(Continued)

OTHER PUBLICATIONS

International Search Report for PCT/EP2014/069215, issued Dec. 17, 2014.

*Primary Examiner* — Mahmoud Gimie
(74) *Attorney, Agent, or Firm* — Norton Rose Fulbright US LLP; Gerard Messina

(57) ABSTRACT

A method for measuring an engine load of a drive motor in a vehicle. Here, at least one parameter which characterizes the engine load is allocated a driving distance equivalent. This driving distance equivalent is then incremented by a driving distance counter. If the vehicle is equipped with a sailing functionality, the driven distance is counted only if the vehicle is moving and the drive train is coupled to the drive motor without slip. A rate of rotation sensor, a clutch sensor and a driving distance counter able to be switched on and off are required for running the method of the present invention. A computer program is used in addition.

12 Claims, 2 Drawing Sheets

(52) U.S. Cl.
CPC ... *B60W 2530/14* (2013.01); *B60W 2530/145* (2013.01); *G07C 5/085* (2013.01)

(58) Field of Classification Search
USPC .......................................................... 701/102
See application file for complete search history.

(56) References Cited

U.S. PATENT DOCUMENTS

| | | | |
|---|---|---|---|
| 2013/0197728 A1* | 8/2013 | Blackwood | G01L 3/26 701/21 |
| 2013/0291629 A1* | 11/2013 | Falzarano | B60K 37/02 73/114.01 |
| 2014/0145876 A1* | 5/2014 | Friend | G01S 19/52 342/357.35 |

FOREIGN PATENT DOCUMENTS

| | | |
|---|---|---|
| DE | 100 26 738 C1 | 10/2001 |
| DE | 101 38 703 C1 | 3/2003 |
| DE | 10 2008 044 91 A1 | 4/2009 |
| DE | 10 2008 049 009 A1 | 4/2010 |
| DE | 10 2010 041 539 A1 | 3/2012 |
| DE | 10 2010 038 106 A1 | 4/2012 |
| DE | 10 2011 081 771 A1 | 2/2013 |
| DE | 10 2011 054 782 A1 | 4/2013 |
| EP | 2234070 | 9/2010 |
| WO | WO 2011/089251 | 7/2011 |
| WO | WO 2012/079716 | 6/2012 |

\* cited by examiner

METHOD AND DEVICE FOR MEASURING AN ENGINE LOAD OF A DRIVE MOTOR OF A VEHICLE

FIELD

The present invention relates to a method and a device for measuring an engine load of a drive motor of a vehicle. The present invention also relates to a computer program and a computer program product suitable for executing the method.

BACKGROUND INFORMATION

Measuring the driving distance covered by a vehicle is normally accomplished by a driving distance counter (odometer), whose reading is displayed to the driver. The recorded travel distance is usually calculated on the basis of wheel rotation and transmission revolution information and reflects the distance driven by the vehicle. This distance represents a measure of the wear of the vehicle and its components. The driven distance constitutes essential information for ascertaining the residual value of a used vehicle. There are conventional devices which display a remaining time as estimated travel distance until the next required vehicle inspection as a function of the current wear of the vehicle.

In the case of vehicles equipped with a "sailing functionality", in particular what is known as start-stop sailing, that is to say, an expanded sailing functionality in which the combustion engine is switched off during the sailing operation, this conventionally determined driving distance may deviate considerably from the distance covered by the internal combustion engine as drive. In such vehicles the internal combustion engine has mostly driven "less travel distance" than the vehicle. Although this circumstance is usually correctly taken into account during the vehicle inspection, it is not made available to the end user in the form of direct information. Depending on the user driving cycle, sailing components of up to 30% of the total driving distance have been observed in vehicle testing, i.e., the odometer implies a driving output of the engine that is up to 30% higher.

An example method in accordance with the present invention allows a measurement of an engine driving output that characterizes the engine load of a drive motor of a vehicle. Here, at least one parameter which characterizes the engine load is allocated a driving distance equivalent. The driving distance equivalent is continuously incremented in an odometer and displayed to the driver. The indication of a separate engine driving output which characterizes the engine load constitutes interesting information for the driver of the vehicle and, for instance, may be used for obtaining a higher residual value of a vehicle equipped with the sailing functionality in the event of a resale, for example.

Preferably, a measure of the crankshaft revolutions of the motor of the vehicle is used as parameter characterizing the engine driving output. The crankshaft revolutions represent an easily acquirable measure of the engine load and thus the driving output of the engine.

According to another development of the method, the at least one parameter characterizing the engine driving output is the particular driving distance of the vehicle during which the drive motor is coupled to a drive train of the vehicle. In vehicles equipped with the sailing functionality, for instance, the engine load is able to be measured in a more realistic manner in this way.

Especially preferably, coupling of the drive motor to the drive train is assumed when a clutch is closed without slip or largely without slip, e.g., when the clutch is operated in micro-slip. This state represents the instant at which the measurement of the engine load should usefully be started in vehicles featuring a sailing functionality.

Especially preferably, the driving distance during which the drive motor is coupled to the drive train of the vehicle is interpreted directly as engine driving output. If the vehicle has a sailing functionality, the engine driving output is able to be directly measured via the driven distance when the drive engine is coupled to the drive train.

The engine driving output is advantageously displayed to the driver of the vehicle. This additional information is of use to the vehicle driver in order for inferring the engine load and thus the engine driving output. The engine driving output is advantageously displayed to the driver in addition to the conventionally displayed driving distance.

An example device in accordance with the present invention for ascertaining an engine load of a drive motor of a vehicle includes a device for acquiring at least one parameter that characterizes the engine load, and a conversion device, by which an engine load is able to be converted into a driving distance equivalent.

The device for acquiring at least one parameter characterizing the engine load preferably includes one or more of the following sensor(s): a rate-of-rotation sensor or a clutch sensor for detecting the operating state of a clutch, by which the drive engine is able to be coupled to a drive train.

According to one advantageous specific embodiment, the conversion device has a driving distance counter which can be connected or disconnected as a function of a switching signal. In this way a driving distance equivalent of the engine load is able to be measured directly.

An example computer program in accordance with the present invention allows the example method according to the present invention to be implemented in an existing control unit without structural changes being required. It carries out all of the steps of the method according to the present invention when it is running on a computer device or a control unit. Retroactive fitting is possible as well.

BRIEF DESCRIPTION OF THE DRAWINGS

Exemplary embodiments of the present invention are illustrated in the figures and are explained in greater detail below.

DETAILED DESCRIPTION OF EXAMPLE EMBODIMENTS

Hereinafter, two exemplary embodiments of a method of the present invention for measuring an engine load of a drive motor of a vehicle will be described. The first exemplary embodiment converts a measured parameter which characterizes the engine load into a driving distance equivalent and increments it continuously in a driving distance counter. The second exemplary embodiment preferably is used in a vehicle equipped with a sailing functionality.

Figure 1:
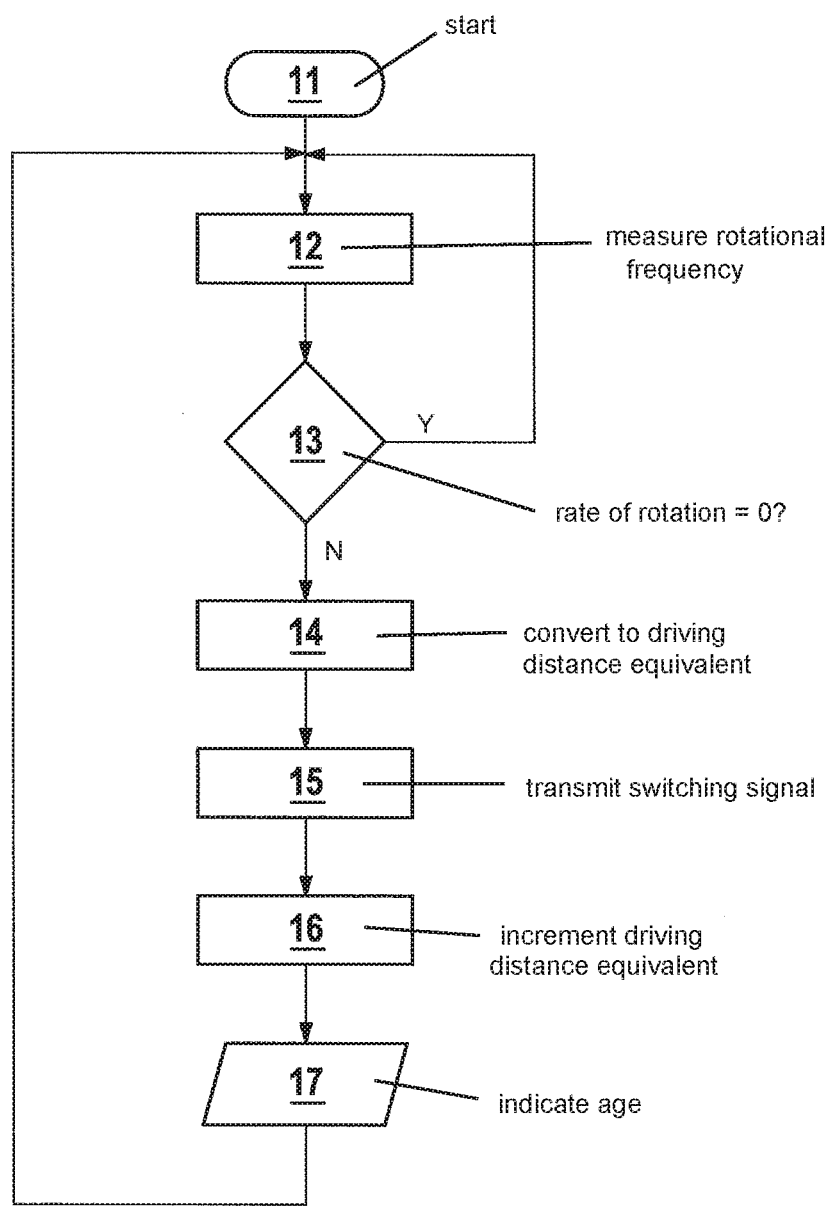
FIG. 1 shows a flow diagram of the method according to a first exemplary embodiment of the present invention.

FIG. 1 shows the flow diagram of the method of the present invention according to a first specific embodiment. The method starts in step 11. In the following step 12, the rotational frequency of the crankshaft of the drive motor is measured with the aid of a rate-of-rotation sensor. It is then checked in step 13 whether this rate of rotation equals zero. If this is the case, branching back to before step 12 takes place. If the rotational frequency is not equal to zero, the rate of rotation of the crankshaft is converted into a driving distance equivalent in step 14. This driving distance equivalent now constitutes a realistic measure of the engine load, since the driving distance equivalent is ascertained only when the motor is actually running. In step 15, a switching signal is therefore transmitted to the driving distance counter, so that it continuously counts (increments) the driving distance equivalent in step 16. The driving distance counter in this exemplary embodiment thus always indicates a distance that corresponds to the real engine age. This engine age is advantageously indicated in step 17 as driving distance equivalent in kilometers or miles, so that the driver has the opportunity to compare this engine age to the driving distance of the conventional driving distance counter. The conventional driving distance counter indicates a measure of the loading of the vehicle in general. In contrast, the driving distance counter according to the present invention indicates a measure of the loading of the drive motor. A change back to before step 12 then takes place and the afore-described method steps are run though anew. The driving distance counter is thereby updated on a continuous basis.

Figure 2:
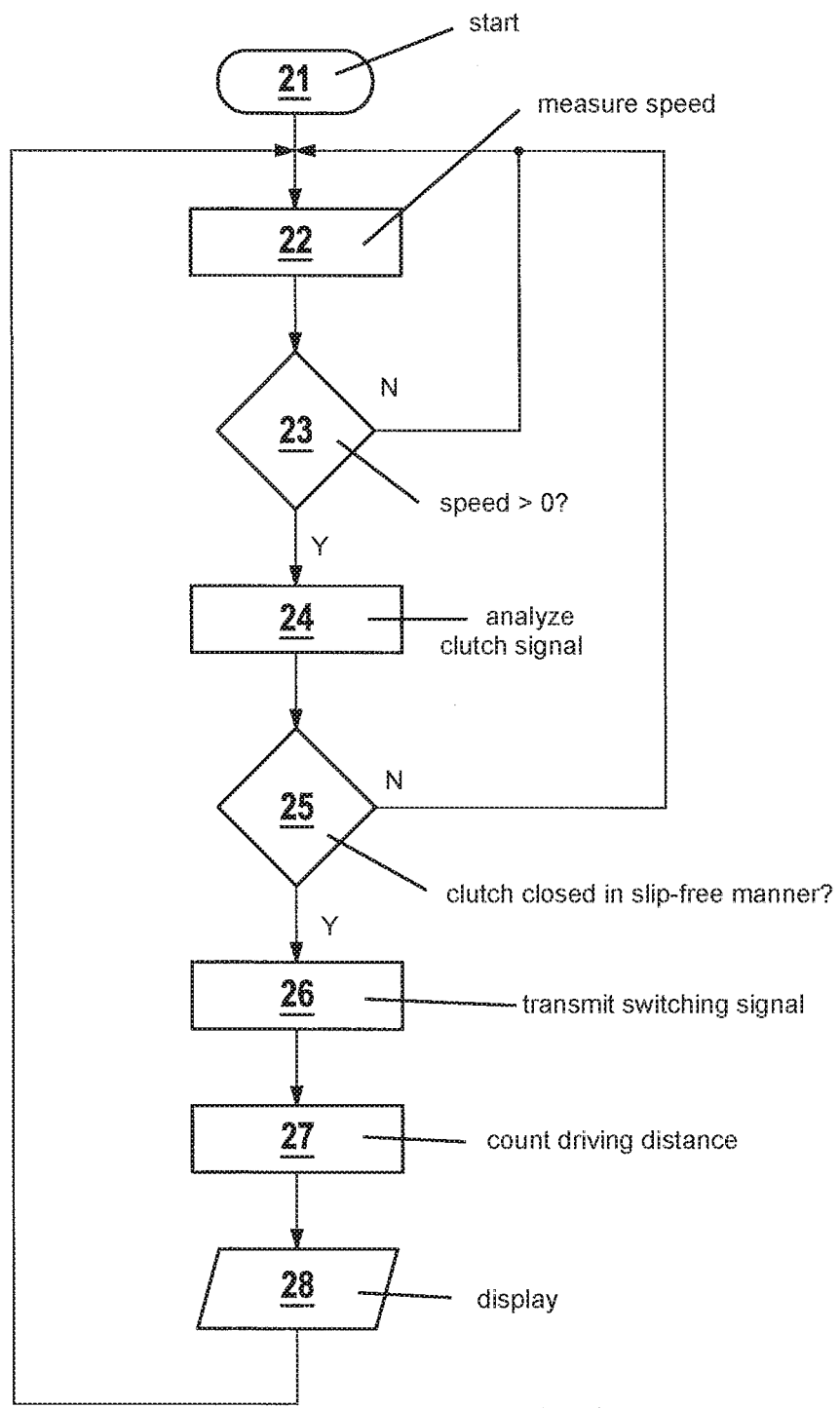
FIG. 2 shows a flow diagram of the method according to a second exemplary embodiment of the present invention.

FIG. 2 shows the flow diagram of the method of the present invention according to a second specific embodiment. In this exemplary embodiment the vehicle has a sailing functionality. Following a start signal in step 21, the speed of the vehicle is measured in step 22. If the vehicle is standing (speed=0), a switch to before step 22 takes place again. If the vehicle has a finite speed (step 23), i.e., the speed is greater than zero, the clutch signal of a clutch sensor is analyzed (step 24). In so doing, it is ascertained whether the drive motor is connected to the drive train. It is checked whether the clutch is closed in a slip-free manner (step 25). If this is not the case, then a switch back to method step 22 takes place. However, if the clutch is closed without slip and the engine thus is coupled to the drive train, a switching signal is transmitted to the driving distance counter (step 26). The driving distance counter thereupon starts counting the driving distance (incrementing, step 27). This driving distance is displayed to the driver in step 28. Afterward, a return to before step 22 takes place and the speed of the vehicle is measured and checked further.

The conventional driving distance counter shows the distance traveled in total, whereas the driving distance counter in this exemplary embodiment only counts when the vehicle is moving and the drive train is coupled to the drive motor. In this exemplary embodiment, an engine age in kilometers or miles is therefore indicated to the driver as well. However, the loading of the engine caused by third consumers (such as the climate control system) is not taken into account in the process.

In both exemplary embodiments, the method can very advantageously be realized as a computer program. The flow diagrams shown in the figures, each describing the methods of the present invention, are used in this context. The computer program is able to be processed by a control unit.

In summary, the method of the present invention according to both the first and the second exemplary embodiment makes it possible to measure the engine load of a drive motor of a vehicle, which is displayed to the vehicle driver.

The device of the present invention for ascertaining an engine load of a drive motor of a vehicle includes a device for acquiring at least one parameter that characterizes the engine load; it also includes a conversion device, by which an engine load is able to be converted into a driving distance equivalent. According to one advantageous specific embodiment, the conversion device has a driving distance counter which is able to be connected or disconnected as a function of a switching signal.

According to a first exemplary embodiment, the device for acquiring at least one parameter characterizing the engine load includes a rate-of-rotation sensor, and according to a second exemplary embodiment, a clutch sensor for detecting the operating state of a clutch, by which the drive engine is able to be coupled to a drive train.

The direct measuring and displaying of the engine driving output characterizing an engine load as driving distance equivalent can increase the residual value of a vehicle equipped with a sailing functionality.

What is claimed is:

1. A method for measuring a driving output characterizing an engine load of a drive motor of a vehicle, comprising:
   ascertaining, using a clutch sensor, if the drive motor is coupled to a drive train of the vehicle;
   incrementing continuously a driving distance in a driving distance counter, the incremented driving distance being precisely the driving distance of the vehicle during which the drive motor is coupled to the drive train of the vehicle and during which the vehicle is moving;
   wherein the driving distance in the driving distance counter is incremented only when both (i) it is ascertained that the drive motor is coupled to the drive train of the vehicle, and (ii) the vehicle is moving.

2. The method as recited in claim 1, wherein the driving distance during which the drive motor is coupled to the drive train of the vehicle is displayed to the driver of the vehicle.

3. The method as recited in claim 1, wherein coupling of the drive motor to the drive train is assumed when a clutch is closed largely without slip.

4. The method as recited in claim 1, wherein the drive motor is an internal combustion engine.

5. A method for measuring a driving output characterizing an engine load of a drive motor of a vehicle, comprising:
   incrementing continuously a driving distance in a driving distance counter, the incremented driving distance being precisely the driving distance of the vehicle during which the drive motor is coupled to a drive train of the vehicle and during which the vehicle is moving;
   wherein coupling of the drive motor to the drive train is assumed when a clutch is closed largely without slip.

6. The method as recited in claim 5, wherein the drive motor is an internal combustion engine.

7. A device designed to:
   increment continuously a driving distance in a driving distance counter, the incremented driving distance being precisely the driving distance of the vehicle during which the drive motor is coupled to a drive train of the vehicle and during which the vehicle is moving;
   wherein coupling of the drive motor to the drive train is assumed when a clutch is closed largely without slip.

8. The device as recited in claim 7, wherein the device is designed to ascertain, using a clutch sensor, if the drive motor is coupled to the drive train, and the driving distance in the driving distance counter is incremented only when both (i) it is ascertained that the drive motor is coupled to the drive train of the vehicle, and (ii) the vehicle is moving.

9. The device as recited in claim 7, wherein the drive motor is an internal combustion engine.

10. A computer program product including program code which is stored on a non-transitory machine-readable carrier, the program code, when executed on a computer or control unit of a vehicle, causing the computer or control unit to perform:

incrementing continuously a driving distance in a driving distance counter, the incremented driving distance being precisely the driving distance of the vehicle during which the drive motor is coupled to a drive train of the vehicle and during which the vehicle is moving;

wherein coupling of the drive motor to the drive train is assumed when a clutch is closed largely without slip.

11. The computer program product as recited in claim 10, wherein the computer or control unit performs:

ascertaining, using a clutch sensor, if the drive motor is coupled to the drive train of the vehicle, wherein the driving distance in the driving distance counter is incremented only when both (i) it is ascertained that the drive motor is coupled to the drive train of the vehicle, and (ii) the vehicle is moving.

12. The computer program product as recited in claim 10, wherein the drive motor is an internal combustion engine.

\* \* \* \* \*